US010047680B2

(12) United States Patent
Tsuda

(10) Patent No.: US 10,047,680 B2
(45) Date of Patent: Aug. 14, 2018

(54) DETECTING ACTUATION OF AIR FLOW CONTROL VALVE OF INTERNAL COMBUSTION ENGINE AND CORRESPONDING CONTROL THEREOF

(71) Applicant: TOYOTA JIDOSHA KABUSHIKI KAISHA, Toyota-shi, Aichi-ken (JP)

(72) Inventor: Satoshi Tsuda, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 154 days.

(21) Appl. No.: 15/071,448

(22) Filed: Mar. 16, 2016

(65) Prior Publication Data

US 2016/0333800 A1   Nov. 17, 2016

(30) Foreign Application Priority Data

May 15, 2015   (JP) .................................. 2015-100286

(51) Int. Cl.
*F02D 9/08*   (2006.01)
*F02D 9/02*   (2006.01)
(Continued)

(52) U.S. Cl.
CPC ........... *F02D 9/02* (2013.01); *F02D 41/2454* (2013.01); *F02P 5/1504* (2013.01); *F02D 41/22* (2013.01);
(Continued)

(58) Field of Classification Search
CPC .. F02D 41/18; F02D 41/22; F02D 2009/0201; F02D 2200/0404; F02D 9/02;
(Continued)

(56) References Cited

U.S. PATENT DOCUMENTS 4,608,958 A * 9/1986 Sakakibara ......... F02D 41/2096
                                              123/498
4,729,358 A * 3/1988 Morita .................. F02D 41/045
                                              123/406.47
(Continued)

FOREIGN PATENT DOCUMENTS

JP   H11-173182 A   6/1999
JP   2008-019738 A   1/2008
(Continued)

*Primary Examiner* — Marguerite McMahon
*Assistant Examiner* — Tea Holbrook
(74) *Attorney, Agent, or Firm* — Hunton Andrews Kurth LLP

(57) ABSTRACT

An air flow velocity calculating device of a internal combustion engine, has a cylinder, a spark plug, an air intake passage, an air flow controlling valve, an air flow velocity calculating portion, and an electric discharge current controlling portion. An electric discharge between a center electrode and a ground electrode is sustained during an electric discharge sustaining period. The electric discharge sustaining period is a period from when the electric discharge begins to when the electric discharge is intercepted by the air flow. Energy is supplied to the spark plug, so that the electric discharge current is sustained at a constant value by the electric discharge current controlling portion during an ignition period. The ignition period is a sum of an electric discharge sustaining period of a first electric discharge and electric discharge sustaining periods of second and subsequent electric discharges in one cycle of the internal combustion engine.

2 Claims, 14 Drawing Sheets

(51) Int. Cl.
- *F02D 41/24* (2006.01)
- *F02P 5/15* (2006.01)
- *F02M 35/10* (2006.01)
- *F02D 41/22* (2006.01)

(52) U.S. Cl.
CPC ............... *F02D 2009/0201* (2013.01); *F02M 35/10386* (2013.01); *Y02T 10/46* (2013.01)

(58) Field of Classification Search
CPC .... F02D 41/045; F02D 41/2454; Y02T 10/46; Y02T 10/42; F02M 35/10386; F02P 5/1512; F02P 5/1504
USPC ... 123/406.12, 344, 402, 406.57, 143 R, 319
See application file for complete search history.

(56) References Cited

U.S. PATENT DOCUMENTS

2002/0166527 A1\* 11/2002 Takahashi ................ F01L 1/34
 123/90.17
2015/0144101 A1\* 5/2015 Deguchi .................. F02P 3/02
 123/406.13

FOREIGN PATENT DOCUMENTS

| JP | 2009-030515 A | 2/2009 |
| JP | 2014-145306 A | 8/2014 |

\* cited by examiner

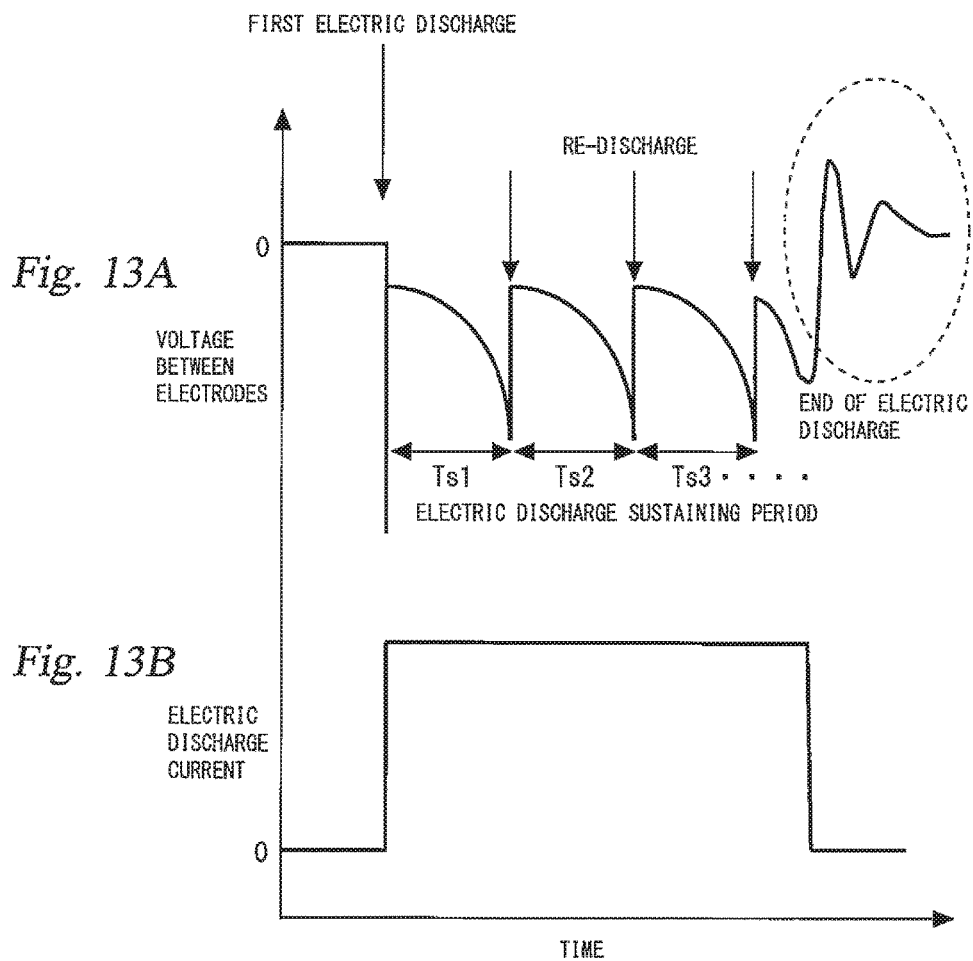

DETECTING ACTUATION OF AIR FLOW CONTROL VALVE OF INTERNAL COMBUSTION ENGINE AND CORRESPONDING CONTROL THEREOF

BACKGROUND OF THE INVENTION

Field of the Invention

The present disclosure relates to an air flow velocity calculating device of an internal combustion engine having a spark plug with a center electrode and a ground electrode placed in a cylinder, and an air flow controlling valve placed in an air intake passage.

Description of the Related Art

An internal combustion engine measuring an electric discharge period of a spark plug on the basis of a change of voltage of a center electrode of the spark plug, is known. The internal combustion engine is described in Japanese Patent Application Publication No. 2009-030515 (JP-A-2009-030515). It is described that there is a one-to-one relationship between the electric discharge period of the spark plug and velocity of air flow near the spark plug, and the velocity of the air flow near the spark plug monotonously decreases in accordance with increase of the electric discharge period, in JP-A-2009-030515. Also, it is described that the electric discharge period corresponds to strength (velocity) of rotational flow in a combustion chamber, in JP-A-2009-030515. It is described that when high voltage is impressed and breakdown occurs between electrodes of the spark plug, an electric discharge occurs and then the electric discharge is sustained, in JP-A-2009-030515. Also, it is described that when the electric discharge occurs, current flows between the electrodes of the spark plug, and then the voltage between the electrodes rapidly decreases. It is described that after the electric discharge is blown out by the air flow, the electrodes of the spark plug are insulated again, and then the voltage between the electrodes rapidly increases, in JP-A-2009-030515. Also, it is described that the electric discharge period can be obtained by monitoring the voltage of the center electrode, by detecting two peaks in time series change of the voltage of the center electrode, and by measuring time between the two peaks, in JP-A-2009-030515.

Typically, if the spark plug ignites once during one cycle of the internal combustion engine, a second electric discharge between the center electrode and the ground electrode of the spark plug is executed, after a first electric discharge between the center electrode and the ground electrode is intercepted by air flow in the cylinder, and then electric discharges between the center electrode and the ground electrode are intermittently repeated, until energy is consumed and the electric discharges cannot be executed.

Typically, velocity of the air flow in the cylinder can be calculated on the basis of an electric discharge sustaining period. The first electric discharge between the center electrode and the ground electrode is sustained during the electric discharge sustaining period. The electric discharge sustaining period is a period from when the first electric, discharge begins to when the first electric discharge is intercepted by the air flow in the cylinder. However, it is difficult to calculate the velocity of the air flow in the cylinder on the basis of an electric discharge sustaining period of second or subsequent electric discharge, because electromagnetic energy of a spark coil is consumed while the first electric discharge is executed.

As mentioned above, the spark plug ignites only once during one cycle of the internal combustion engine. Accordingly, if an irregular phenomenon occurs while the first electric discharge between the center electrode and the ground electrode is executed, the velocity of the air flow in the cylinder cannot be precisely calculated on the basis of the electric discharge sustaining period in which the first electric discharge is sustained. An example of the irregular phenomenon is a rapid change of a direction of the air flow.

SUMMARY OF THE INVENTION

An object of the present disclosure is to provide an air flow velocity calculating device of an internal combustion engine which can improve calculation accuracy of velocity of air flow in a cylinder.

The present disclosure provides an air flow velocity calculating device of an internal combustion engine, comprising: a cylinder; a spark plug having a center electrode and a ground electrode placed in the cylinder; an air intake passage connected to the cylinder; an air flow controlling valve, actuated to control air flow in the cylinder, and placed in the air intake passage; an air flow velocity calculating portion for calculating velocity of the air flow in the cylinder on the basis of an electric discharge sustaining period, an electric discharge between the center electrode and the ground electrode being sustained during the electric discharge sustaining period, the electric discharge sustaining period being a period from when the electric discharge begins to when the electric discharge is intercepted by the air flow in the cylinder; and an electric discharge current controlling portion for controlling an electric discharge current between the center electrode and the ground electrode, wherein energy is supplied to the spark plug, so that the electric discharge current between the center electrode and the ground electrode is sustained at a constant value by the electric discharge current controlling portion during an ignition period, wherein the ignition period is a sum of an electric discharge sustaining period of a first electric discharge between the center electrode and the ground electrode during one cycle of the internal combustion engine, and electric discharge sustaining periods of second and subsequent electric discharges between the center electrode and the ground electrode during the cycle of the internal combustion engine, wherein the second and subsequent electric discharges are executed subsequently to the first electric discharge after the first electric discharge is intercepted by the air flow in the cylinder.

The air flow velocity calculating device of the internal combustion engine may further comprise a judging portion for judging whether the velocity of the air flow in the cylinder calculated on the basis of the electric discharge sustaining period of the first electric discharge is abnormal, wherein if the judging portion judges that the velocity of the air flow in the cylinder calculated on the basis of the electric discharge sustaining period of the first electric discharge is abnormal, the air flow velocity calculating portion calculates the velocity of the air flow in the cylinder on the basis of one of the electric discharge sustaining periods of the second and subsequent electric discharges.

Namely, in the air flow velocity calculating device of the internal combustion engine of the present disclosure, the electric discharge current between the center electrode and the ground electrode is sustained at the constant value during the ignition period. Consequently, the electric discharge sustaining period of the second or the subsequent electric discharge during one cycle of the internal combustion engine being shorter than the electric discharge sustaining period of the first electric discharge during the cycle of the internal combustion engine, caused by consumption of electromagnetic energy of the spark coil while the first electric discharge is executed during the cycle of the internal combustion engine, is restrained.

In other words, in the air flow velocity calculating device of the internal combustion engine of the present disclosure, not only the electric discharge sustaining period of the first electric discharge but also the electric discharge sustaining period of the second or the subsequent electric discharge can be used in order to calculate the velocity of the air flow in the cylinder. Accordingly, the air flow velocity calculating device of the internal combustion engine of the present disclosure can improve the calculation accuracy of the velocity of the air flow in the cylinder rather than a case in which the electric discharge sustaining period of the first electric discharge is only used in order to calculate the velocity of the air flow in the cylinder.

Other and further objects, features and advantages of the invention will appear more fully from the following description.

BRIEF DESCRIPTION OF THE DRAWINGS

FIG. 13A is a time chart showing the voltage between the center electrode 22a and the ground electrode 22b in the first embodiment of the air flow velocity calculating device of the internal combustion engine of the present disclosure.

FIG. 13B is a time chart showing the electric discharge current between the center electrode 22a and the ground electrode 22b in the first embodiment of the air flow velocity calculating device of the internal combustion engine of the present disclosure.

DETAILED DESCRIPTION OF THE PREFERRED EMBODIMENTS

Figure 4:
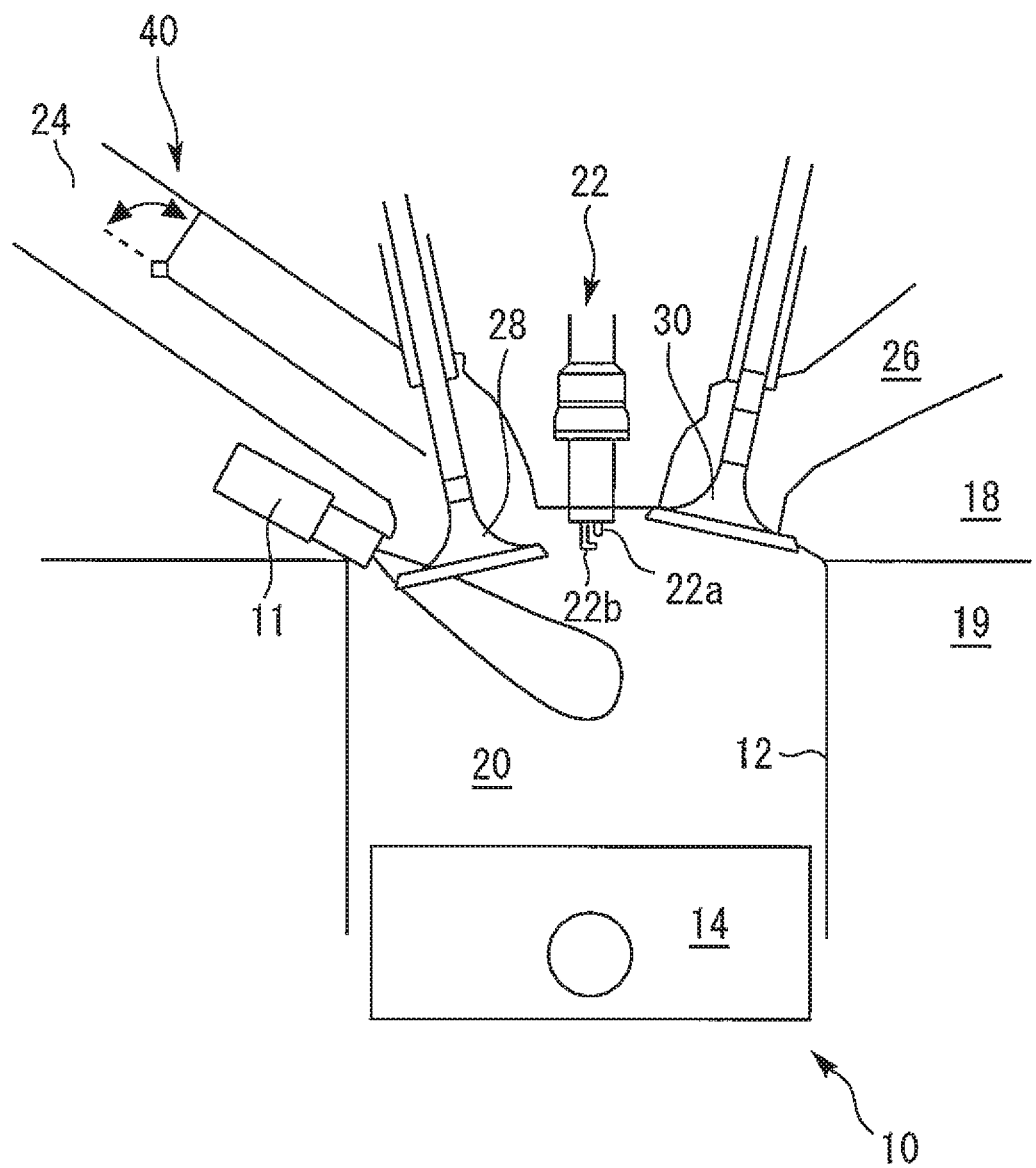
FIG. 4 is a schematic view of an internal combustion engine 10 to which a first embodiment of an air flow velocity calculating device of the internal combustion engine of the present disclosure is applied.

Before explaining a first embodiment of an air flow velocity calculating device of an internal combustion engine of the present disclosure, an embodiment of the disclosure relating to the present disclosure is explained. FIG. 4 is a schematic view of an internal combustion engine 10 to which the embodiment of the disclosure relating to the present disclosure is applied. The first embodiment of the air flow velocity calculating device of the internal combustion engine of the present disclosure which is explained in detail below, can be applied to the internal combustion engine 10 shown in FIG. 4.

In an example shown in FIG. 4, a cylinder 1 formed in a cylinder block 19, and a piston 14 reciprocating in the cylinder 12 are provided. A combustion chamber 20 is formed by a lower surface of a cylinder head 18, an inner surface of the cylinder 12, and an upper surface of the piston 14. A fuel injector 11 is placed in the cylinder head 18 to directly inject fuel into the combustion chamber 20. A spark plug 22 having a center electrode 22a and a ground electrode 22b placed in the cylinder 12 is provided. Namely, the center electrode 22a and the ground electrode 22b of the spark plug 22 project into the combustion chamber 20.

In an example shown in FIG. 4, an air intake passage 24 and an exhaust passage 26 are connected to the cylinder 12. An intake valve 28 is placed between the air intake passage 24 and the combustion chamber 20. The intake valve 28 is constituted so that the intake valve 28 can open or close. An exhaust valve 30 is placed between the combustion chamber 20 and the exhaust passage 26. The exhaust valve 30 is constituted so that the exhaust valve 30 can open or close. An air flow control valve 40 such as tumble control valve (TCV) swirl control valve (SCV), etc. is placed in the air intake passage 24 in order to control air flow in the cylinder 12. As shown by double headed arrow in FIG. 4, the air flow control valve 40 can rotate between a position shown by a solid line and a position shown by a dotted line. Combustion condition such as lean combustion, stoichiometric combustion, etc. is changed by changing opening degree of the air flow control valve 40, in detail.

The air flow in the cylinder 12 is activated by controlling (actuating) the air flow control valve 40. Accordingly, the combustion condition is improved. Particularly, if homogeneous lean burn or EGR (Exhaust Gas Recirculation) is executed, turbulence generated by the air flow in the cylinder 12 is necessary for securing stability of the combustion condition. In an operating area where output of the internal combustion engine 10 is required, if narrowing of the intake passage 24 is executed by closing the air flow control valve 40, power performance is decreased by lacking air volume. Accordingly, when output is required, the air flow control valve 40 usually opens in order to secure the air volume.

In an operating state of the internal combustion engine 10, there is a difference between combustion realized when the air flow control valve 40 closes and the combustion realized when the air flow control valve 40 opens. For example, the combustion in which an air fuel ratio is equal to 25 can be realized when the air flow control valve 40 closes. When the air flow control valve 40 opens, lean operation (lean combustion) in which the air flow ratio is equal to or less than 23 can be realized. Consequently, it is desired that a change of the combustion and a change of the air flow by the air flow control valve 40 are executed while the operating state is confirmed. If the change of the combustion and the change of the air flow by the air flow control valve 40 are executed without confirming the operating state, a combustion fluctuation can increase or a misfire can occur.

Figure 3:
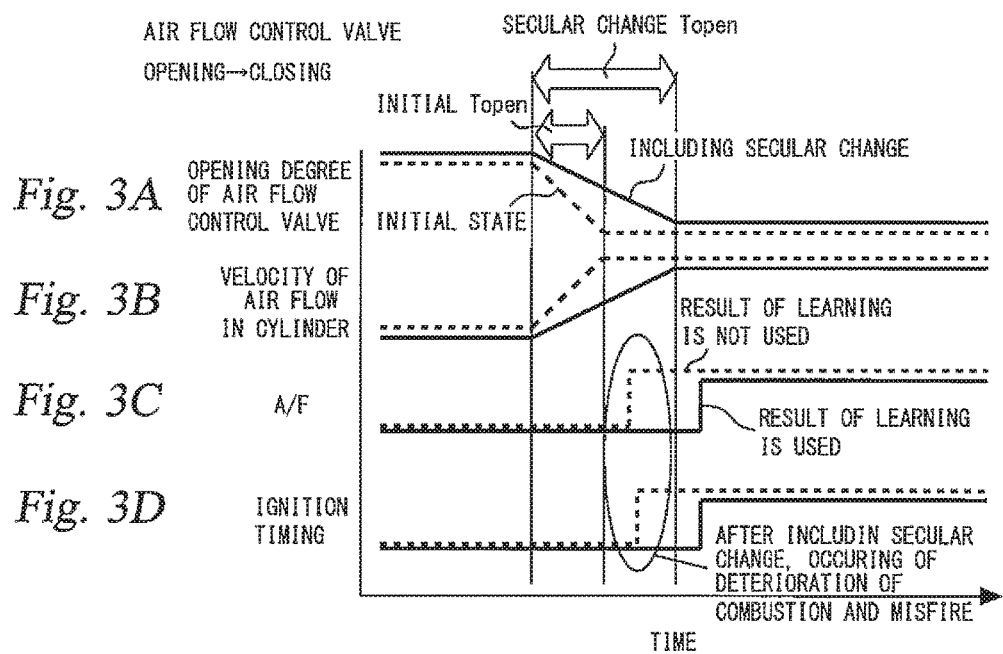
FIG. 3A is a time chart of opening degree of the air flow control valve 40 while the closing movement of the air flow control valve 40 is executed.
FIG. 3B is a time chart of velocity of air flow in a cylinder while the closing movement of the air flow control valve 40 is executed.
FIG. 3C is a time chart of an air fuel ratio while the closing movement of the air flow control valve 40 is executed.
FIG. 3D is a time chart of ignition timing while e closing movement of the air flow control valve 40 is executed.

In the internal combustion engine 10 constituted similar to the example shown in FIG. 4, the air flow control valve 40 has a tendency to increase time required to rotate the air flow control valve 40 between the position shown by the solid line and the position shown by a dotted line in FIG. 4, according to a secular change, as shown in FIG. 3A.

Typically, even if speed of a movement of the air flow control valve 40 decreases according to the secular change, it is assumed that a switching movement (an opening movement or a closing movement) of the air flow control valve 40 is completed, when a predetermined time passes after the air flow control valve 40 is commanded to switch (open or close). And then, another combustion parameters, which are explained below, are changed, without confirming a state of the air flow control valve 40.

FIG. 3A shows the opening degree of the air flow control valve 40 (see FIG. 4) while the closing movement of the air flow control valve 40 is executed, and compares the opening degree of the air flow control valve 40 used in an initial state and the opening degree of the air flow control valve 40 including the secular change. FIG. 3B shows and compares velocity (shown by a dotted line in FIG. 3B) of the air flow in the cylinder 12 (see FIG. 4) while the air flow control valve 40 is used in the initial state, and the velocity (shown by a solid line in FIG. 3B) of the air flow in the cylinder 12 while the air flow control valve 40 includes the secular change.

As shown in FIG. 3A, time required for the opening movement of the air flow control valve 40 used in the initial state is "initial state Topen". The time required for the opening movement of the air flow control valve 40 including the secular change increases to "secular change Topen".

As shown in FIG. 3B, according to decrease of the opening degree of the air flow control valve 40, the velocity of the air flow in the cylinder 12 increases.

Figure 9:
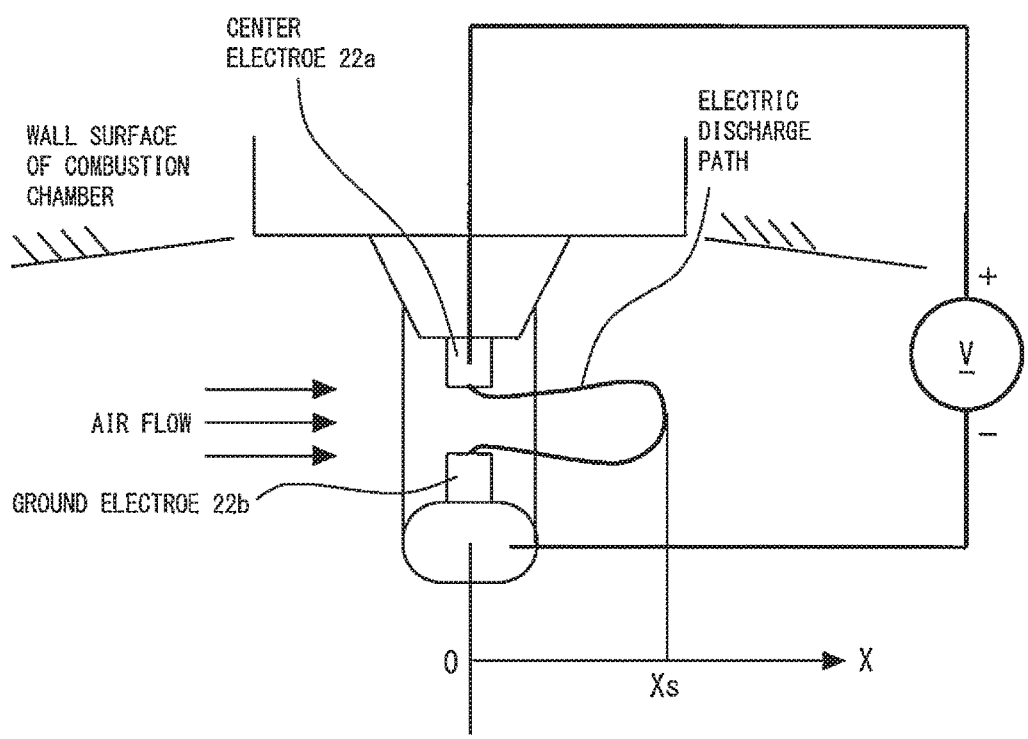
FIG. 9 is a schematic view which explains an ignition discharge between a center electrode 22a and a ground electrode 22b.

In the example shown in FIG. 4, as shown in FIG. 9, a discharge voltage (voltage between the center electrode 22a and the ground electrode 22b) of the spark plug 22 is measured. The velocity of the air flow near the center electrode 22a and the ground electrode 22b is estimated (calculated) on the basis of transition of the discharge voltage (the voltage between the electrodes) shown in FIG. 12A.

FIG. 3C shows the air fuel ratio if result of learning of the time required for the movement of the air flow control valve 40 including the secular change is not used, and the air fuel ratio if the result of the learning of the time required for the movement of the air flow control valve 40 including the secular change is used, the learning is explained below.

As shown by a dotted line in FIG. 3C, if the result of the learning of the time required for the movement of the air flow control valve 40 is not used, before the closing movement of the air flow control valve 40 including the secular change is completed, control for changing the air fuel ratio is executed. As shown by a solid line in FIG. 3C, if the result of the learning of the time required for the movement of the air flow control valve 40 is used, after the closing movement of the air flow control valve 40 including the secular change is completed, the control for changing the air fuel ratio is executed.

FIG. 3D shows ignition timing if the result of the learning of the time required for the movement of the air flow control valve 40 including the secular change is not used, and the ignition timing if the result of the learning of the time required for the movement of the air flow control valve 40 including the secular change is used.

As shown by a dotted line in FIG. 3D, if the result of the learning of the time required for the movement of the air flow control valve 40 is not used, before the closing movement of the air flow control valve 40 including the secular change is completed, ignition is executed. As shown by a solid line in FIG. 3D, if the result of the learning of the time required for the movement of the air flow control valve 40 is used, after the closing movement of the air flow control valve 40 including the secular change is completed, the ignition is executed.

Namely, if the result of the learning of the time required for the movement of the air flow control valve 40 is not used, as shown by a portion surrounded by an ellipse in FIGS. 3C and 3D, deterioration of the combustion and the misfire can occur, because change control of the air fuel ratio and the ignition are executed before the closing movement of the air flow control valve 40 including the secular change is completed.

As mentioned above, if it is assumed that the switching movement (the opening movement or the closing movement) of the air flow control valve 40 is completed, when the predetermined time passes after the air flow control valve 40 is commanded to switch (open or close), and if the combustion parameters are changed without confirming the state of the air flow control valve 40 before the switching movement (the opening movement or the closing movement) of the air flow control valve 40 including the secular change is completed, the deterioration of the combustion and the misfire can occur.

Considering the above mentioned problem, in the embodiment of the disclosure relating to the present disclosure, the learning of the time required for the movement of the air flow control valve 40 is executed.

Figure 1:
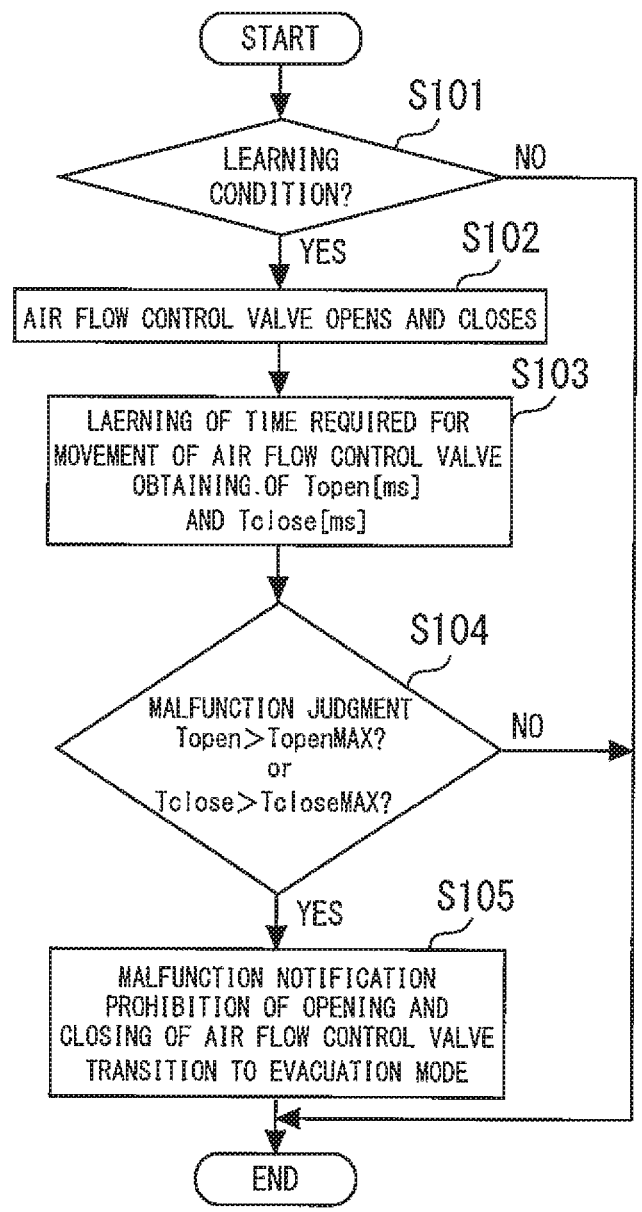
FIG. 1 is a flowchart which explains learning of time required for a movement of an air flow control valve 40 in an embodiment of the disclosure relating to the present disclosure.

FIG. 1 is a flowchart which explains the learning of the time required for the movement of the air flow control valve 40 (see FIG. 4) in the embodiment of the disclosure relating to the present disclosure.

After routine shown in FIG. 1 starts, judgment whether a condition is adapted for the learning of the time required for the movement of the air flow control valve 40 in step S101. If YES, the routine goes to step S102. If NO, the routine finishes and restarts from step S101 after a predetermined time passes.

In step S102, the opening movement or the closing movement of the air flow control valve 40 is executed. Then, in step S103, the learning of the time required for the movement of the air flow control valve 40 is executed. Specifically, time Topen [ms] required for a rotation movement from an open position shown by the dotted line to a close position shown by the solid line in FIG. 4 of the air flow control valve 40 is obtained. Time Tclose [ms] required for a rotation movement from the close position shown by the solid line to the open position shown by the dotted line in FIG. 4 of the air flow control valve 40 is obtained.

Figure 6:
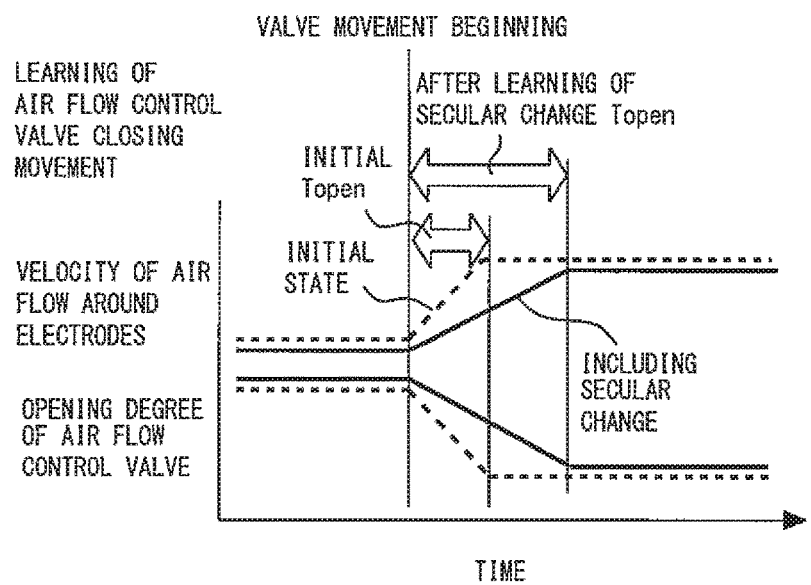
FIG. 6A is a time chart of velocity of air flow around a spark plug.
FIG. 6B is a time chart of the opening degree of the air flow control valve 40.

The opening degree of the air flow control valve 40 (see FIG. 4) and the velocity of the air flow near the center electrode 22a (see FIG. 4) and the ground electrode 22b (see FIG. 4) of the spark plug 22 (see FIG. 4) (the velocity of the air flow around the spark plug) have relationship shown in FIGS. 6A and 6B.

FIG. 6A shows the velocity of the air flow around the spark plug (the velocity of the air flow near the center electrode 22a and the ground electrode 22b of the spark plug 2). FIG. 6B shows the opening degree of the air flow control valve 40.

As shown in FIGS. 6A and 6B, the velocity of the air flow near the center electrode 22a and the ground electrode 22b of the spark plug 22 decreases according to increase of the opening degree of the air flow control valve 40. In other words, the velocity of the air flow near the center electrode 22a and the ground electrode 22b of the spark plug 22 increases according to decrease of the opening degree of the air flow control valve 40.

Figure 5:
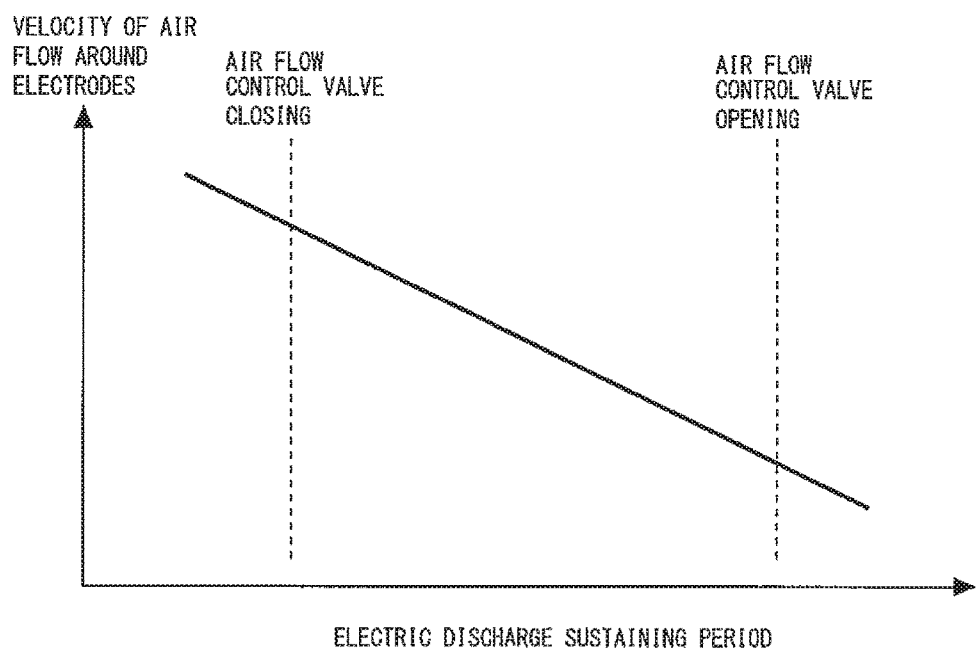
FIG. 5 is a graph showing relationship between velocity of air flow around electrodes and an electric discharge sustaining period.

The velocity of the air flow near the center electrode 22a and the ground electrode 22b of the spark plug 22, and an electric discharge sustaining period between the center electrode 22a and the ground electrode 22b have relationship shown in FIG. 5.

FIG. 5 shows the relationship between the velocity of the air flow around the electrodes and the electric discharge sustaining period. As shown in FIG. 5, if the opening degree of the air flow control valve 40 (see FIG. 4) is small and if the velocity of the air flow around the electrodes (the velocity of the air flow near the center electrode 22A and the ground electrode 22b of the spark plug 22) is large, the electric discharge sustaining period between the center electrode 22a and the ground electrode 22b is small. If the opening degree of the air flow control valve 40 (see FIG. 4) is large and if the velocity of the air flow around the electrodes is small, the electric discharge sustaining period between the center electrode 22a and the ground electrode 22b is large.

FIG. 9 is a schematic view which explains an ignition discharge between the center electrode 22a and the ground electrode 22b. As shown in FIG. 9, after voltage is impressed between the center electrode 22a and the ground electrode 22b, and after breakdown of gas between the center electrode 22a and the ground electrode 22b occurs, the ignition discharge occurs between the center electrode 22a and the ground electrode 22b, and an electric discharge path (electric spark path) shown in FIG. 9 is formed.

If the air flow shown by arrows in FIG. 9 exists near the center electrode 22a and the ground electrode 22b, an extended (curved) electric discharge path is formed between the center electrode 22a and the ground electrode 22b, as shown in FIG. 9. If the air flow does not exist near the center electrode 22a and the ground electrode 22b, a straight electric discharge path shown in FIG. 10A is formed between the center electrode 22a and the ground electrode 22b, the straight electric discharge path is not extended (curved) as shown in FIG. 10A.

Figure 10:
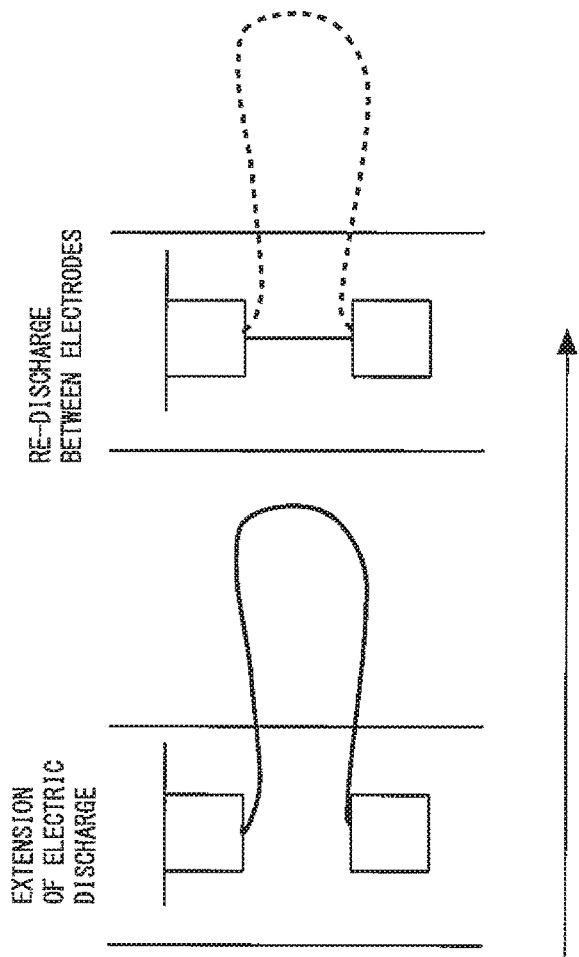
FIGS. 10A to 10D are schematic views which explain extension of an electric discharge path (electric spark path) between the center electrode 22a and the ground electrode 22b.

FIGS. 10A to 10D explain extension of the electric discharge path (see FIG. 9) between the center electrode 22a (see FIGS. 4 and 9) and the ground electrode 22b (see FIGS. 4 and 9). If the air flow exists near the center electrode 22a and the ground electrode 22b, as shown in FIG. 10A, immediately after an electric discharge between the center electrode 22a and the ground electrode 22b begins, the straight electric discharge path is formed between the center electrode 22a and the ground electrode 22b.

Then, as shown in FIG. 10B, the electric discharge path is extended (curved) by the air flow near the center electrode 22a and the ground electrode 22b. Then, as shown in FIG. 10C, the electric discharge path is further extended (curved) by the air flow near the center electrode 22a and the ground electrode 22b. When the electric discharge path is extended to an extent shown in FIG. 10C, electrical resistance in the electric discharge path increases, and the air flow moves gas in which breakdown does not occur, to a position between the center electrode 22a and the ground electrode 22b. Consequently, as shown by a dotted line in FIG. 10D, the electric discharge between the center electrode 22a and the ground electrode 22b is intercepted. At the same time, if sufficient energy is supplied to the spark plug 22 (see FIG. 4) in order to successively execute the electric discharge between the center electrode 22a and the ground electrode 22b, next electric discharge (re-discharge) is executed between the center electrode 22a and the ground electrode 22b, and then the electric discharge path shown by a solid line in FIG. 10D is formed.

Figure 11:
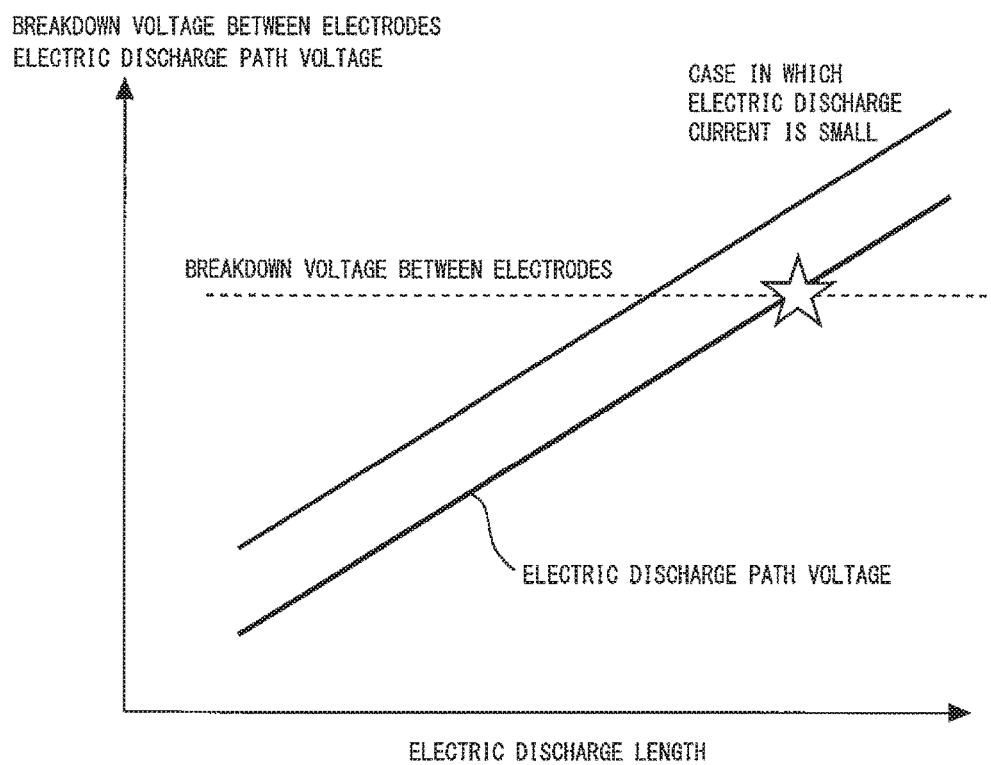
FIG. 11 is a graph which explains interception of a first electric discharge shown by a dotted line in FIG. 10D between the center electrode 22a and the ground electrode 22b, and re-discharge shown by a solid line in FIG. 10D between the center electrode 22a and the ground electrode 22b.

FIG. 11 is a graph which explain interception of a first electric discharge shown by the dotted line in FIG. 10D between the center electrode 22a and the ground electrode 22b, and the re-discharge shown by the solid line in FIG. 10D between the center electrode 22a and the ground electrode 22b. In FIG. 11, a horizontal axis shows an electric discharge length (a length of the electric discharge path), and a vertical axis shows breakdown voltage between the electrodes and electric discharge path voltage. As shown in FIG. 11, the electric discharge path voltage increases according to increase of the length of the electric discharge path (the electric discharge length).

In an example shown in FIGS. 10A to 10D, when the length of the electric discharge path of the first electric discharge (see FIG. 12A) increases to an extent shown by the dotted line in FIG. 10D, as shown by a star in FIG. 11, the electric discharge path voltage (see FIG. 11) reaches the breakdown voltage between the electrodes (see FIG. 11), the first electric discharge between the center electrode 22a (see FIGS. 4 and 9) and the ground electrode 22b (see FIGS. 4 and 9) is intercepted, and the re-discharge is executed between the center electrode 22a and the ground electrode 22b.

As show in FIG. 11, if an electric discharge current is small, when the electric discharge path of the first electric discharge is shorter than a case in which the electric discharge current is large, the first electric discharge between the center electrode 22a and the ground electrode 22b is intercepted, and the re-discharge is executed between the center electrode 22a and the ground electrode 22b.

In this specification, a period from when the electric discharge between the center electrode 22a (see FIGS. 4 and 9) and the ground electrode 22b (see FIGS. 4 and 9) begins as shown in FIG. 10A, to when the electric discharge between the center electrode 22a and the ground electrode 22b is intercepted by the air flow in the cylinder 12 (see FIG. 4) as shown in FIG. 10D, is called the electric discharge sustaining period.

When the electric discharge between the center electrode 22a and the ground electrode 22b is intercepted as shown by the dotted line in FIG. 10D, if the sufficient energy is supplied to the spark plug 22 (see FIG. 4) in order to successively execute the electric discharge between the center electrode 22a and the ground electrode 22b, the next electric discharge is executed between the center electrode 22a and the ground electrode 22b as shown by the solid line in FIG. 10D.

Accordingly, in the specification, the electric discharge between the center electrode 22a and the ground electrode 22b, which is executed first during one cycle of the internal combustion engine, is called the first electric discharge. For example, "Ts1" shown in FIG. 12A corresponds to the electric discharge sustaining period of the first electric discharge. Also, in the specification, the electric discharges between the center electrode 22a and the ground electrode 22b, which are executed subsequently to the first electric discharge as shown in FIG. 10D, are called second and subsequent electric discharges. For example, "Ts2" shown in FIG. 12A corresponds to the electric discharge sustaining period of a second electric discharge, and "Ts3" shown in FIG. 12A corresponds to the electric discharge sustaining period of a third electric discharge.

In the specification, an ignition period of the ignition, which is executed once during each cycle of the internal combustion engine, of the spark plug 22 is defined as a sum of the electric discharge sustaining period Ts1 (see FIG. 12A) of the first electric discharge and electric discharge sustaining periods Ts2, Ts3, etc. (see FIG. 12A) of second and subsequent electric discharges, wherein the second and subsequent electric discharges between the center electrode 22a and the ground electrode 22b are executed subsequently to the first electric discharge between the center electrode 22a and the ground electrode 22b after the first electric discharge is intercepted by the air flow in the cylinder 12. Particularly, in an example shown in FIG. 12A, the ignition period of the ignition of the spark plug 22 corresponds to a period from time of the first electric discharge shown in FIG. 12A to time of an end of the electric discharge shown in FIG. 12A.

Figure 12A:
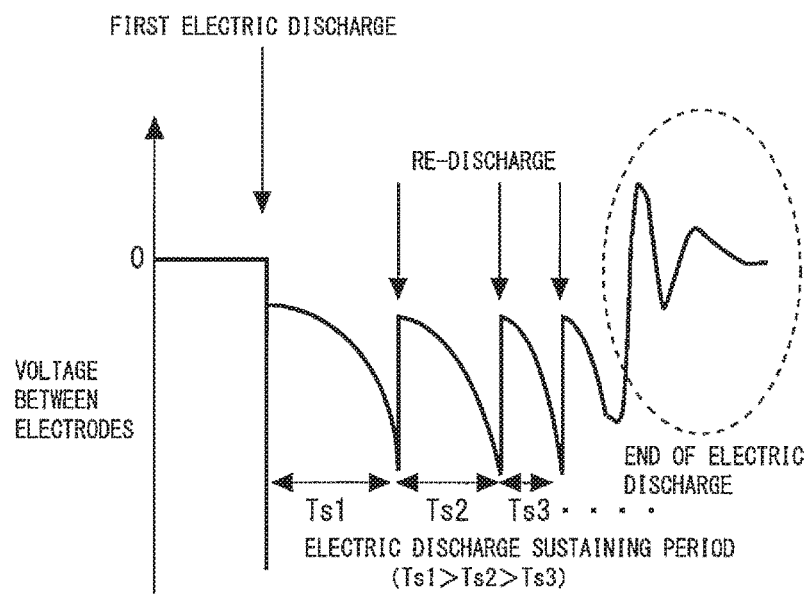
FIG. 12A is a time chart showing an electric discharge current between the center ground electrode 22b.
Figure 12B:
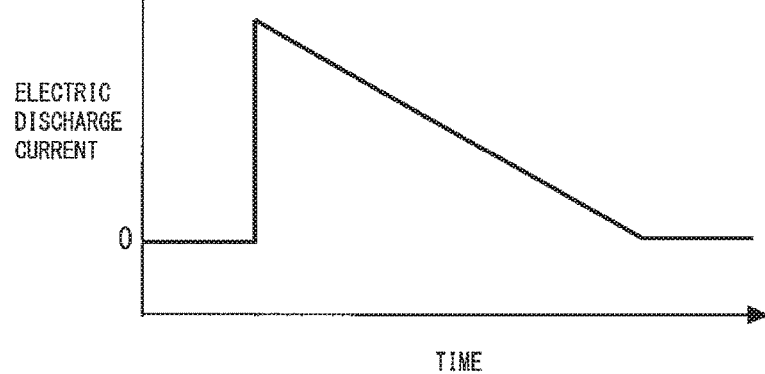
FIG. 12B is a time chart showing an electric discharge current between the center electrode 22a and the ground electrode 22b.

FIG. 12A shows the voltage between the center electrode 22a and the ground electrode 22b (the voltage between the electrodes). FIG. 12B shows the electric discharge current between the center electrode 22a and the ground electrode 22b. As shown in FIG. 12A, when the first electric discharge is intercepted as shown by the dotted line in FIG. 10D, the voltage between the center electrode 22a and the ground electrode 22b (the voltage between the electrodes) has an extreme value. Also, as shown in FIG. 12A, when the re-discharge (the next electric discharge) is executed as shown by the solid line in FIG. 10D, the voltage between the center electrode 22a and the ground electrode 22b rapidly approaches ground voltage (0 [V]). By using this character, it is judged that the re-discharge is executed when difference between the voltage between the electrodes measured last time and the voltage between the electrodes measured this time is larger than a predetermined threshold.

Returning to explanation of FIG. 1, in step S103, the electric discharge sustaining period Ts1 is calculated on the basis of time when the first electric discharge shown in FIG. 12A is executed and time when the re-discharge shown in FIG. 12A is executed, for example. Then, the velocity of the air flow is calculated on the basis of the relationship shown in FIG. 5, for example. Then, the opening degree of the air flow control valve 40 (see FIG. 4) is calculated on the basis of the relationship shown in FIGS. 6A and 6B, and the time Topen required for the closing movement from an opening state to a closing state of the air flow control valve 40 is calculated. Similarly, the time Tclose required for the opening movement from the closing state to the opening state of the air flow control valve 40 is calculated. Namely, change of the time Topen required for the closing movement of the air flow control valve 40 and change of the time Tclose required for the opening movement of the air flow control valve 40 are learned in step S103.

Then, in step S104, malfunction judgment is executed. Concretely, judgment whether the time Topen required for the closing movement calculated in step S103 is larger than a threshold TopenMAX is executed. Also, judgment whether the time Tclose required for the opening movement calculated in step S103 is larger than a threshold TcloseMAX is executed. If YES in at least one of them, the routine goes to step S105. If NO in both of them, the routine finishes and restarts from step S101 after the predetermined time passes.

In step S105, malfunction notification is executed. Concretely, the opening movement and the closing movement of the air flow control valve 40 (see FIG. 4) is prohibited, and transition to an evacuation mode is executed. In an example shown in FIG. 1, the malfunction of the air flow control valve 40 and change of the air flow control valve 40 including the secular change can be detected without using an exclusive malfunction detecting sensor for the air flow control valve 40. Consequently, a cost of the malfunction detecting sensor can be decreased.

Also, the result of the learning of the time required for the switching movement (the opening movement or the closing movement) of the air flow control valve 40 including the secular change is used. Accordingly, the deterioration of the combustion and the misfire before completion of the switching movement (the opening movement or the closing movement) of the air flow control valve 40 as shown by the portion surrounded by the ellipse in FIGS. 3C and 3D, are prevented. Consequently, the combustion can be stabilized.

Figure 2:
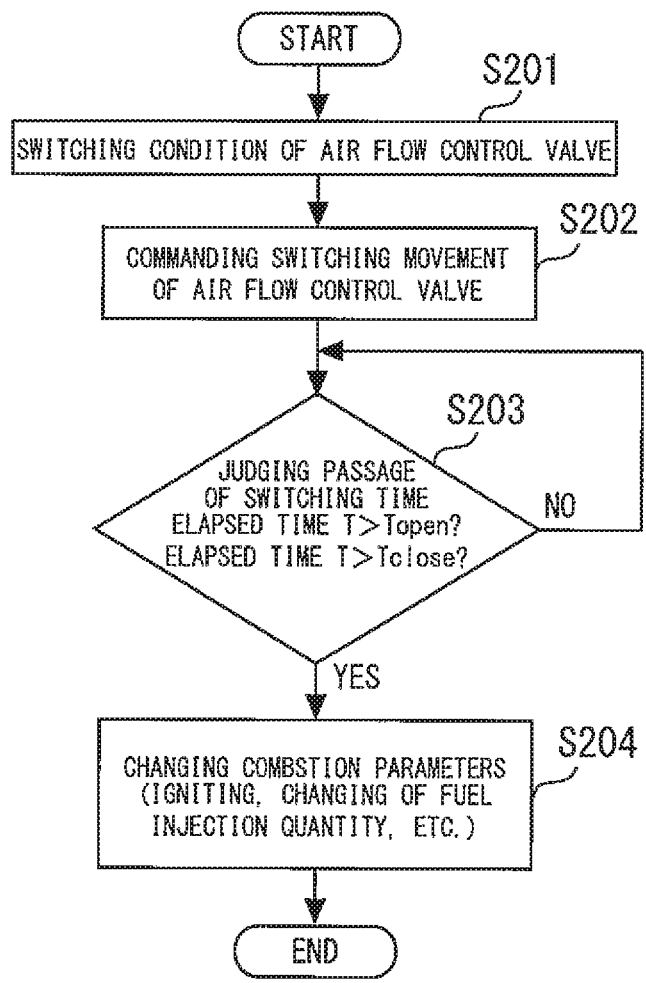
FIG. 2 is a flowchart which explains control for preventing control such as ignition control, from being executed before completion of an opening movement or a closing movement of the air flow control valve 40 which includes a secular change.

FIG. 2 is a flowchart which explains control for preventing control such as ignition control, from being executed before the completion of the opening movement or the closing movement of the air flow control valve 40 which includes the secular change. Namely, FIG. 2 is the flowchart which explains the control for preventing execution of switching the air fuel ratio before the completion of the closing movement of the air flow control valve 40 including the secular change as shown in FIG. 3C, or execution of the ignition before the completion of the closing movement of the air flow control valve 40 including the secular change as shown in FIG. 3D.

After routine shown in FIG. 2 starts, a switching condition of the air flow control valve 40 is read in step S201. Then, in step S202, the switching movement of the air flow control valve 40 is commanded. The switching movement of the air flow control valve 40 is executed only under a condition which is adapted for the switching movement of the air flow control valve 40.

Then, in Step S203, judgment of passage of switching time of the air flow control valve 40 (see FIG. 4) is executed. Concretely, if the air flow control valve 40 is switched from the opening state to the closing state as shown in FIG. 3A, judgment whether elapsed time T is larger than the time Topen is executed, wherein the elapsed time T is time after the switching movement of the air flow control valve 40 begins.

As shown in FIG. 3A, the time Topen is set to a small value at an initial stage of use of the air flow control valve 40, and the time Topen is set to a large value after the air flow control valve 40 includes the secular change.

If the elapsed time T is larger than the time Topen, it is judged that a situation shown by the portion surrounded by the ellipse in FIGS. 3C and 3D does not occur, and the routine goes to step S204, wherein the elapsed time T is the time after the switching movement of the air flow control valve 40 begins. If the elapsed time T is not larger than the time Topen, it is judged that the situation shown by the portion surrounded by the ellipse in FIGS. 3C and 3D can occur, and step S203 is executed again after a predetermined time passes. Namely, a change of another combustion parameters which are explained below, is prohibited.

Also, in step S203, if the air flow control valve 40 (see FIG. 4) is switched from the closing state to the opening state, judgment whether the elapsed time T is larger than the time Tclose is executed, wherein the elapsed time T is the time after the switching movement of the air flow control valve 40 begins. Similar to an example shown in FIG. 3A, the time Tclose is set to a small value at the initial stage of the use of the air flow control valve 40, and the time Tclose is set to a large value after the air flow control valve 40 includes the secular change.

If the elapsed time T is larger than the time Tclose, it is judged that the situation shown by the portion surrounded by the ellipse in FIGS. 3C and 3D does not occur, and the routine goes to step S204, wherein the elapsed time T is the time after the switching movement of the air flow control valve 40 begins. If the elapsed time T is not larger than the time Tclose, it is judged that the situation shown by the portion surrounded by the ellipse in FIGS. 3C and 3D can occur, and step S203 is executed again after the predetermined time passes. Namely, the change of the combustion parameters which are explained below, is prohibited.

In step S204, execution of the change of the combustion parameters is permitted. Concretely, execution of the ignition shown in FIG. 3D is permitted, for example. A change of fuel injection quantity shown in FIG. 3C is permitted. Namely, in an example shown in FIG. 2, even if the time required for the switching movement of the air flow control valve 40 (see FIG. 4) is changed because of the secular change, a desirable change of the combustion is executed.

Concretely, the electric discharge sustaining period Ts1 is calculated on the basis of time when the first electric discharge shown in FIG. 12A is executed and time when the re-discharge shown in FIG. 12A is executed, for example. Then, the velocity of the air flow in the cylinder 12 (see FIG. 4) is calculated on the basis of the electric discharge sustaining period Ts1 between the center electrode 22a (see FIGS. 4 and 9) and the ground electrode 22b (see FIGS. 4 and 9) and the relationship shown in FIG. 5, for example. A correlation between the electric discharge sustaining period Ts1 and the velocity of the air flow around the electrodes, is higher than a correlation between the electric discharge sustaining periods Ts2, Ts3 see FIG. 12A) and the velocity of the air flow around the electrodes. Consequently, the elect e discharge sustaining period Ts1 and the velocity of the air flow have the relationship shown in FIG. 5, in detail.

Also, the opening degree of the air flow control valve 40 is calculated on the basis of the velocity of the air flow in the cylinder 12 and the relationship shown in FIGS. 6A and 6B. The time (the time Topen or the time Tclose) required for the switching movement of the air flow control valve 40 is calculated. Namely, the learning of the time (the time Topen or the time Tclose) required for the switching movement of the air flow control valve 40 is executed.

Particularly, during each cycle of the internal combustion engine, the electric discharge sustaining period Ts1 is calculated, the velocity of the air flow in the cylinder 12 is calculated, and the opening degree of the air flow control valve 40 is calculated. Consequently, relationship between the opening degree of the air flow control valve 40 and time shown in FIG. 6B is obtained, and the time required for the switching movement (the opening movement or the closing movement) of the air flow control valve 40 is obtained. Accordingly, the combustion fluctuation such as the misfire, etc. can be prevented.

Figure 7:
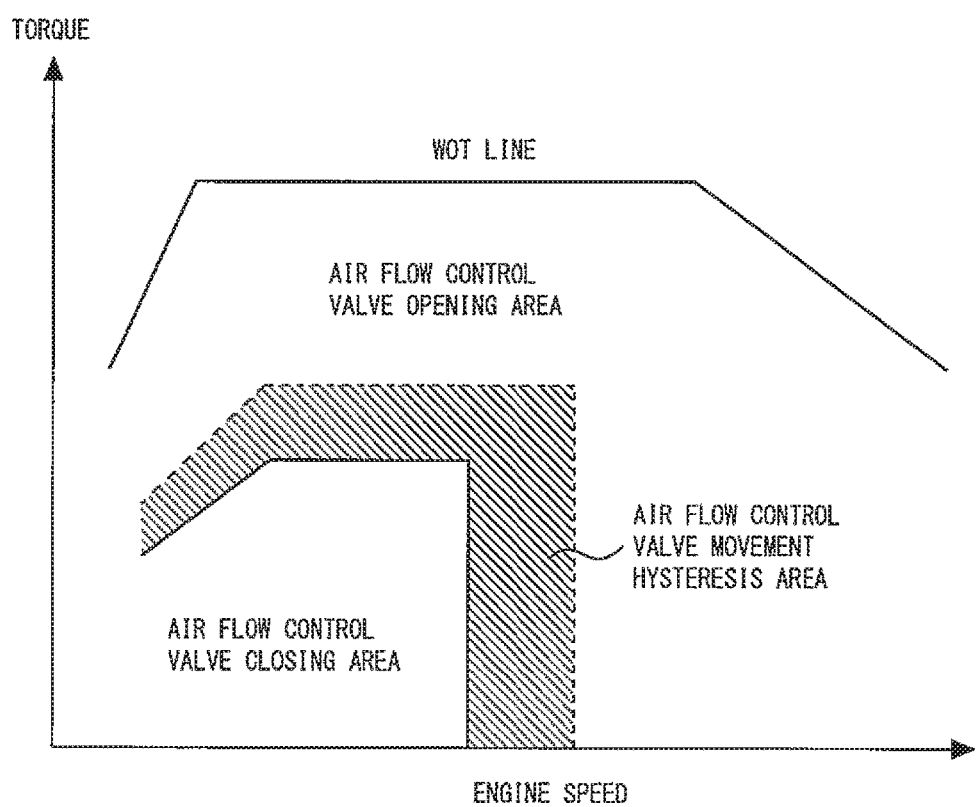
FIG. 7 is a graph which explains an operating area adapted for execution of learning of time required for a switching movement (the opening movement or the closing movement) of the air flow control valve 40.

FIG. 7 is a graph which explains the operating area adapted for execution of the learning of the time (the time Topen or the time Tclose) required for the switching movement of the air flow control valve 40. In FIG. 7, a horizontal axis shows engine speed, and a vertical axis shows torque. As shown in FIG. 7, an air flow control valve closing area is set on a left lower portion of FIG. 7, wherein the opening degree of the air flow control valve 40 is small on the air flow control valve closing area. An air flow control valve opening area is set on a right upper portion of FIG. 7, wherein the opening degree of the air flow control valve 40 is large on the air flow control valve opening area. An area between the air flow control valve closing area and the air flow control valve opening area is shown by hatching in FIG. 7. The area shown by the hatching is a hysteresis area of the switching movement (the opening movement or the closing movement) of the air flow control valve 40.

Figure 8:
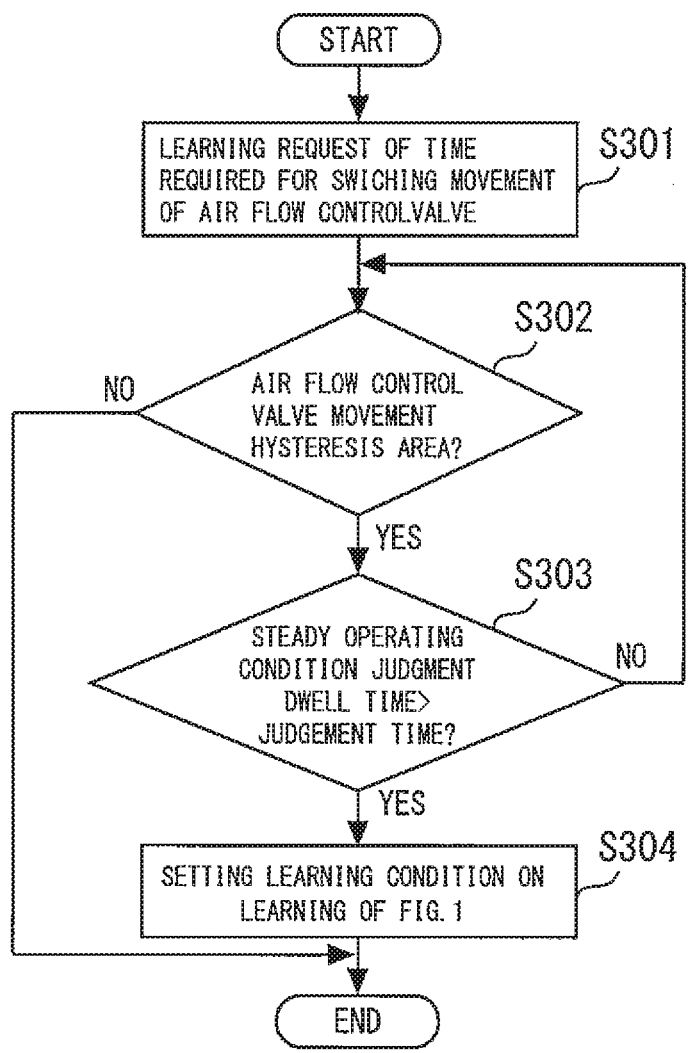
FIG. 8 is a flowchart which explains a condition on which the learning of the time required for the switching movement (the opening movement or the closing movement) of the air flow control valve 40 shown in FIG. 1 is executed.

FIG. 8 is a flowchart which explains a condition on which the learning of the time required for the switching movement (the opening movement or the closing movement) of the air flow control valve 40 (see FIG. 4) shown in FIG. 1 is executed. After routine shown in FIG. 8 starts, the learning of the time required for the switching movement (the opening movement or the closing movement) of the air flow control valve 40 is requested in step S301. Then, in step S302, judgment whether operating condition of the internal combustion engine 10 (see FIG. 4) at present time exists in the hysteresis area shown by the hatching in FIG. 7, is executed. If YES, the routine goes to step S303. If NO, the routine finishes and restarts from step S301 after a predetermined time passes.

In step S303, judgment whether the operating condition of the internal combustion engine 10 at the present time is steady operating condition, is executed. Concretely, judgment whether dwell time is larger than a predetermined threshold (judgment time), is executed, wherein the operating condition of the internal combustion engine 10 dwells in the hysteresis area shown by the hatching in FIG. 7 during the dwell time. If YES, the routine goes to step S304. If NO, the routine goes back to step S302. In step S304, a learning condition is set "ON", and the learning of the time required for the switching movement (the opening movement or the closing movement) of the air flow control valve 40 shown in FIG. 1, is executed.

In an example shown in FIG. 8, the learning of the time required for the switching movement (the opening movement or the closing movement) of the air flow control valve 40 is executed in the hysteresis area shown by the hatching in FIG. 7. Accordingly, the stability of the combustion can be secured during the opening state and the closing state of the air flow control valve 40, wherein the switching movement of the air flow control valve 40 is not executed during the opening state or the closing state of the air flow control valve 40. Also, in the example shown in FIG. 8, the learning of the time required for the switching movement (the opening movement or the closing movement) of the air flow control valve 40 is executed during the steady operating condition of the internal combustion engine 10. Accordingly, accuracy of the learning can be improved without being affected by change of the operating condition of the internal combustion engine 10.

Figure 14:
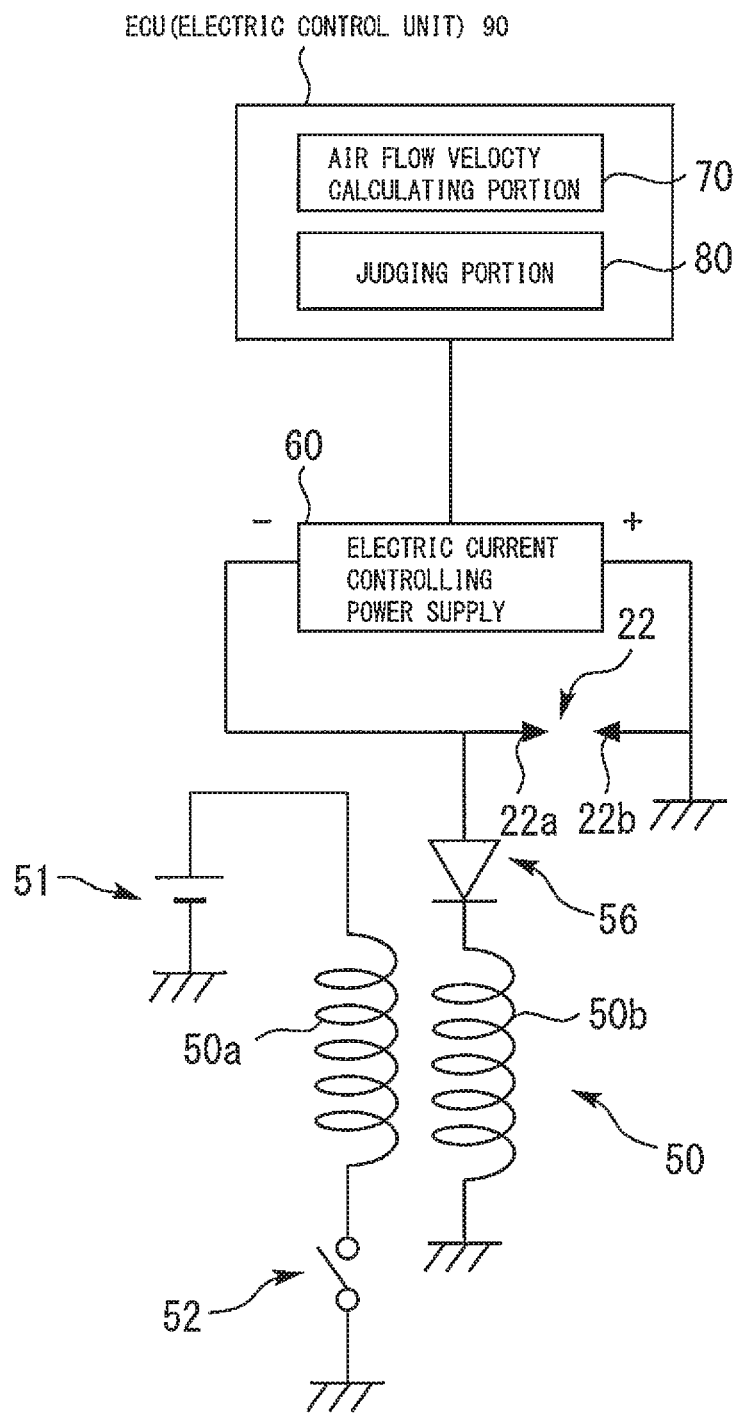
FIG. 14 is a schematic view showing a principal part of the first embodiment of the air flow velocity calculating device of the internal combustion engine of the present disclosure.

The first embodiment of the air flow velocity calculating device of the internal combustion engine of the present disclosure is explained below. FIG. 14 is a schematic view showing a principal part of the first embodiment of the air flow velocity calculating device of the internal combustion engine. FIGS. 13A and 13B explain effect of the first embodiment of the air flow velocity calculating device of the internal combustion engine. Particularly, FIG. 13A shows the voltage between the center electrode 22a and the ground electrode 22b (the voltage between the electrodes) in the first embodiment of the air flow velocity calculating device of the internal combustion engine. FIG. 13B shows the electric discharge current between the center electrode 22a and the ground electrode 22b in the first embodiment of the air flow velocity calculating device of the internal combustion engine.

The first embodiment of the air flow velocity calculating device of the internal combustion engine can be applied to an internal combustion engine system which has a configuration as shown in FIG. 4, for example. The learning of the time required for the switching movement (the opening movement or the closing movement) of the air flow control valve 40 shown in FIG. 1, can be executed by the internal combustion engine system to which the first embodiment of the air flow velocity calculating device of the internal combustion engine is applied.

The control shown in FIG. 2 prevents the control such as the ignition control, from being executed before the completion of the opening movement or the closing movement of the air flow control valve 40 which includes the secular change. The control shown in FIG. 2 can be executed by the internal combustion engine system to which the first embodiment of the air flow velocity calculating device of the internal combustion engine is applied. FIG. 8 shows the routine for judging whether the condition on which the learning of the time required for the switching movement (the opening movement or the closing movement) of the air flow control valve 40 see FIG. 4) is executed, exists. The routine shown in FIG. 8 can be executed by the internal combustion engine system to which the first embodiment of the air flow velocity calculating device of the internal combustion engine is applied.

Typically, if the spark plug ignites once during one cycle of the internal combustion engine, as shown in FIG. 12A, the second electric discharge (the re-discharge) between the center electrode 22a (see FIGS. 4 and 9) and the ground electrode 22b (see FIGS. 4 and 9) of the spark plug 22 (see FIG. 4) is executed, after the first electric discharge between the center electrode 22a and the ground electrode 22b is intercepted by air flow in the cylinder 12 (see FIG. 4), and then electric discharges (re-discharges) between the center electrode 22a and the ground electrode 22b are intermittently repeated, until the energy is consumed and the electric discharges cannot be executed.

Typically, as shown in FIG. 12A, the velocity of the air flow in the cylinder 12 is calculated on the basis of the electric discharge sustaining period Ts1, wherein the electric discharge sustaining period Ts1 is from when the first electric discharge begins between the center electrode 22a and the ground electrode 22b to when the first electric discharge is intercepted by the air flow in the cylinder 12. As shown in FIG. 12B, the electric discharge current between the center electrode 22a and the ground electrode 22b decreases, because electromagnetic energy of a spark coil 50 is consumed while the first electric discharge is executed. Accordingly, the electric discharge sustaining period Ts2 of the second electric discharge is shorter than the electric discharge sustaining period Ts1 of the first electric discharge, and the electric discharge sustaining period Ts3 of the third electric discharge is shorter than the electric discharge sustaining period Ts2 of the second electric discharge.

In an example shown in FIG. 12B, because the electric discharge current decreases according to passage of time, electrolytic dissociated ions decrease in the electric discharge path. As shown in FIG. 11, the electric discharge path voltage increases according to decrease of the electric discharge current. If the electric discharge path voltage increases, the electric discharge is intercepted when the length of the electric discharge path is short. The re-discharge is executed subsequently to the electric discharge, after the electric discharge is intercepted. Consequently, it is difficult to accurately calculate the velocity of the air flow in the cylinder 12 on the basis of the electric discharge sustaining periods Ts2, Ts3, etc. of the second and subsequent electric discharges.

As mentioned above, the spark plug 22 ignites only once during each cycle of the internal combustion engine. Accordingly, if an irregular phenomenon occurs while the first electric discharge between the center electrode 22a and the ground electrode 22b of the spark plug 22 is executed, the velocity of the air flow in the cylinder 12, calculated on the basis of the electric discharge sustaining period Ts1 of the first electric discharge, is not precise, wherein an example of the irregular phenomenon is a rapid change of a direction of the air flow.

Considering the above mentioned problem, the first embodiment of the air flow velocity calculating device of the internal combustion engine is constituted so as to improve calculation accuracy of the velocity of the air flow in the cylinder 12 (see FIG. 4). Concretely, in the first embodiment of the air flow velocity calculating device of the internal combustion engine, as shown in FIG. 13B, the electric discharge current between the center electrode 22a (see FIGS. 4 and 9) and the ground electrode 22b (see FIGS. 4 and 9) is sustained at a constant value. Accordingly, as shown in FIG. 13A, the electric discharge sustaining period Ts1 of the first electric discharge is equal to the electric discharge sustaining period Ts2, Ts3 of the second or the subsequent electric discharge (the re-discharge), wherein the second and subsequent electric discharges are executed subsequently to the first electric discharge. Namely, the correlation between the electric discharge sustaining periods Ts2, Ts3 of the second and subsequent electric discharges (the re-discharges) and the velocity of the air flow in the cylinder 12, increases.

In the first embodiment of the air flow velocity calculating device of the internal combustion engine, if the irregular phenomenon such as the rapid change of the direction of the air flow, etc. occurs while the first electric discharge is executed, the velocity of the air flow in the cylinder 12 is not calculated on the basis of the electric discharge sustaining period Ts1 of the first electric discharge, but calculated on the basis of the electric discharge sustaining period Ts2, Ts3 of the second or the subsequent electric discharge (the re-discharge), in detail. Consequently, the calculation accuracy of the velocity of the air flow in the cylinder 12 is improved rather than a case in which the electric discharge sustaining period Ts1 of the first electric discharge is only used in order to calculate the velocity of the air flow in the cylinder 12.

In the first embodiment of the air flow velocity calculating device of the internal combustion engine, in order to attain the above mentioned effect, as shown in FIG. 14, an air flow velocity calculating portion 70 for calculating the velocity of the air flow in the cylinder 12 (see FIG. 4) on the basis of one of electric discharge sustaining periods Ts1, Ts2, Ts3, etc. (see FIG. 13A) is provided with an ECU (Electric Control Unit) 90. An electric discharge current controlling portion for controlling the electric discharge current between the center electrode 22a and the ground electrode 22b of the spark plug 22, is constituted by the ECU 90 and an electric current controlling power supply 60.

In the first embodiment of the air flow velocity calculating device of the internal combustion engine, the spark coil 50 having a primary coil 50a and a secondary coil 50b is provided. A power supply 51 for inputting voltage to the primary coil 50a is provided. Input of the voltage to the primary coil 50a is switched by a switch 52 such as a transistor to which a control signal is inputted from the ECU 90, etc. When an electric current flowing through the primary coil 50a rapidly decreases, induced voltage occurs in the secondary coil 50b, the electric discharge current flows from the ground electrode 22b to the center electrode 22a, and then the current flows via a diode 56 to the secondary coil 50b.

When the electric discharge current flows from the ground electrode 22b to the center electrode 22b, the electromagnetic energy of the spark coil 50 is consumed. Accordingly, if the electric current controlling power supply 60 is not provided, as shown in FIG. 12B, the electric discharge current continues to decrease during the ignition period, consequently, as shown in FIG. 12A, each of the electric discharge sustaining periods Ts2, Ts3 of the re-discharges is shorter than the electric discharge sustaining period Ts1 of the first electric discharge. Accordingly, each of the electric discharge sustaining periods Ts2, Ts3 of the re-discharge cannot be used in order to calculate the velocity of the air flow in the cylinder 12 (see FIG. 4).

In the first embodiment of the air flow velocity calculating device of the internal combustion engine, the ECU 70 and an electric current controlling power supply 60, which act as the electric discharge current controlling portion, redundantly add energy to the spark plug 22, in order to sustain the electric discharge current between the center electrode 22a and the ground electrode 22b at the constant value during the ignition period as shown in FIG. 13B. Consequently, as shown in FIG. 13A, the electric discharge sustaining period Ts1 of the first electric discharge is equal to each of the electric discharge sustaining periods Ts2, Ts3 of the second and subsequent electric discharges (the re-discharges) which are executed subsequently to the first electric discharge.

Accordingly, in the first embodiment of the air flow velocity calculating device of the internal combustion engine, the velocity of the air flow in the cylinder 12 can be calculated on the basis of not only the electric discharge sustaining period Ts1 of the first electric discharge but also each of the electric discharge sustaining periods Ts2, Ts3 of the second and subsequent electric discharges (the re-discharges).

As mentioned above, the irregular phenomenon such as the rapid change of the direction of the air flow, etc. can occur while the first electric discharge is executed. Considering this problem, in the first embodiment of the air flow velocity calculating device of the internal combustion engine, as shown in FIG. 14, a judging portion 80 for judging whether the velocity of the air flow in the cylinder 12 (see FIG. 4) calculated on the basis of the electric discharge sustaining period Ts1 (see FIG. 13A) of the first electric discharge is abnormal, is provided. If the judging portion 80 judges that the velocity of the air flow in the cylinder 12 calculated on the basis of the electric discharge sustaining period Ts1 of the first electric discharge is abnormal, the air flow velocity calculating portion 70 calculates the velocity of the air flow in the cylinder 12 on the basis of one of the electric discharge sustaining periods Ts2, Ts3 (see FIG. 13A) of the second and subsequent electric discharges (re-discharges).

In the first embodiment of the air flow velocity calculating device of the internal combustion engine, the electric discharge current controlling portion having the electric current controlling power supply 60 placed on a side of the secondary coil 50b in order to additionally supply the energy to the spark plug 22 and to sustain the electric discharge current at the constant value during the ignition period as shown in FIG. 13B. Instead, in a second embodiment of the air flow velocity calculating device of the internal combustion engine, in order to additionally supply the energy to the spark plug 22 and to sustain the electric discharge current at the constant value during the ignition period as shown in FIG. 13B, energy can be added to a side of the primary coil 50a by a pressurization device (not shown), or a plurality of coils (not shown) can be provided besides the primary coil 50a and the secondary coil 50b.

In a third embodiment, the first and second embodiment mentioned above and the examples mentioned above can be combined appropriately.

Obviously many modifications and variations of the present disclosure are possible in the light of the above teachings. It is therefore to be understood that within the scope of the appended claims, the invention may be practiced otherwise than as specifically described.

The entire disclosure of Patent Application No. 2015-100286, filed on May 15, 2015 including specification, claims, drawings and summary, on which the Convention priority of the present application is based, is incorporated herein by reference in its entirety.

The invention claimed is:

1. An internal combustion, comprising:
   a cylinder;
   a spark plug having a center electrode and a ground electrode placed in the cylinder;
   an air intake passage connected to the cylinder;
   an air flow controlling valve, actuated to control air flow in the cylinder, and placed in the air intake passage; and
   an electronic control unit (ECU) including a processor for executing programs stored in memory, the ECU programmed to:

calculate speed of the air flow in the cylinder as a function of an electric discharge sustaining period, an electric discharge between the center electrode and the ground electrode being sustained during the electric discharge sustaining period, the electric discharge sustaining period being a period from when the electric discharge begins to when the electric discharge is intercepted by the air flow in the cylinder;

along with an electric current controlling power supply, control an electric discharge current between the center electrode and the ground electrode, wherein energy is supplied to the spark plug, so that the electric discharge current between the center electrode and the ground electrode is sustained at a constant value by the ECU during an ignition period, wherein the ignition period is a sum of an electric discharge sustaining period of a first electric discharge between the center electrode and the ground electrode in one cycle of the internal combustion engine, and electric discharge sustaining periods of second and subsequent electric discharges between the center electrode and the ground electrode in the cycle of the internal combustion engine, wherein the second and subsequent electric discharges are executed subsequently to the first electric discharge after the first electric discharge is intercepted by the air flow in the cylinder;

judge malfunction of the air flow control valve based on the calculated air flow speed, and if the malfunction is determined, prohibit opening movement and closing movement of the air flow control valve.

2. The internal combustion according to claim 1, the ECU further programmed to:

judge whether the speed of the air flow in the cylinder calculated on the basis of the electric discharge sustaining period of the first electric discharge is abnormal, wherein if the ECU judges that the speed of the air flow in the cylinder calculated on the basis of the electric discharge sustaining period of the first electric discharge is abnormal, the ECU calculates the speed of the air flow in the cylinder on the basis of one of the electric discharge sustaining periods of the second and subsequent electric discharges.

* * * * *